(12) United States Patent
Kamal et al.

(10) Patent No.: US 11,247,602 B2
(45) Date of Patent: Feb. 15, 2022

(54) MOUNTING A GESTURE SENSOR PROXIMATE TO A LIGHT ASSEMBLY

(71) Applicant: Huf Hülsbeck & Fürst GmbH & Co. KG, Velbert (DE)

(72) Inventors: Ehab Kamal, Novi, MI (US); John Nantz, Brighton, MI (US); Khalid Kamal, Novi, MI (US); Rob Nahhal, Clinton Township, MI (US); Yipeng Schulmeister, Troy, MI (US)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 16/788,714

(22) Filed: Feb. 12, 2020

(65) Prior Publication Data

US 2021/0245652 A1    Aug. 12, 2021

(51) Int. Cl.
*B60Q 1/00* (2006.01)
*F21V 23/04* (2006.01)
*F21V 23/00* (2015.01)
*F21S 43/30* (2018.01)
*B60Q 1/30* (2006.01)

(52) U.S. Cl.
CPC ............ *B60Q 1/0023* (2013.01); *F21S 43/30* (2018.01); *F21V 23/006* (2013.01); *F21V 23/0471* (2013.01); *B60Q 1/30* (2013.01)

(58) Field of Classification Search
CPC ......... B60Q 1/0023; B60Q 1/30; F21S 43/30; F21V 23/0471
See application file for complete search history.

(56) References Cited

U.S. PATENT DOCUMENTS

| | | | | | |
|---|---|---|---|---|---|
| 4,224,551 | A | * | 9/1980 | Liebegott | F21S 41/55 313/323 |
| 5,446,470 | A | * | 8/1995 | Avignon | B60Q 1/0023 343/713 |
| 5,963,172 | A | * | 10/1999 | Pfizenmaier | G01S 13/931 343/721 |
| 2008/0158045 | A1 | * | 7/2008 | Teranishi | H01Q 1/3233 342/70 |
| 2018/0229645 | A1 | * | 8/2018 | Hara | F21S 41/50 |
| 2018/0371823 | A1 | * | 12/2018 | Sugiura | B60Q 1/2696 |
| 2019/0275923 | A1 | * | 9/2019 | Fushimi | G01S 7/03 |
| 2020/0101889 | A1 | * | 4/2020 | Iwai | H01Q 1/3233 |
| 2020/0141171 | A1 | * | 5/2020 | Ghannam | B60Q 1/50 |

* cited by examiner

*Primary Examiner* — Bryon T Gyllstrom
*Assistant Examiner* — Christopher E Dunay
(74) *Attorney, Agent, or Firm* — Honigman LLP

(57) ABSTRACT

A light assembly includes a fixture housing, a gesture sensor assembly, a light source supported by the fixture housing, and a reflector supported by the fixture housing and operative to control direction of light emitted from the light source. The gesture sensor assembly includes a gesture sensor operable to provide a sensing electrical field sensitive to gestures executed a predetermined distance from the gesture sensor.

19 Claims, 7 Drawing Sheets

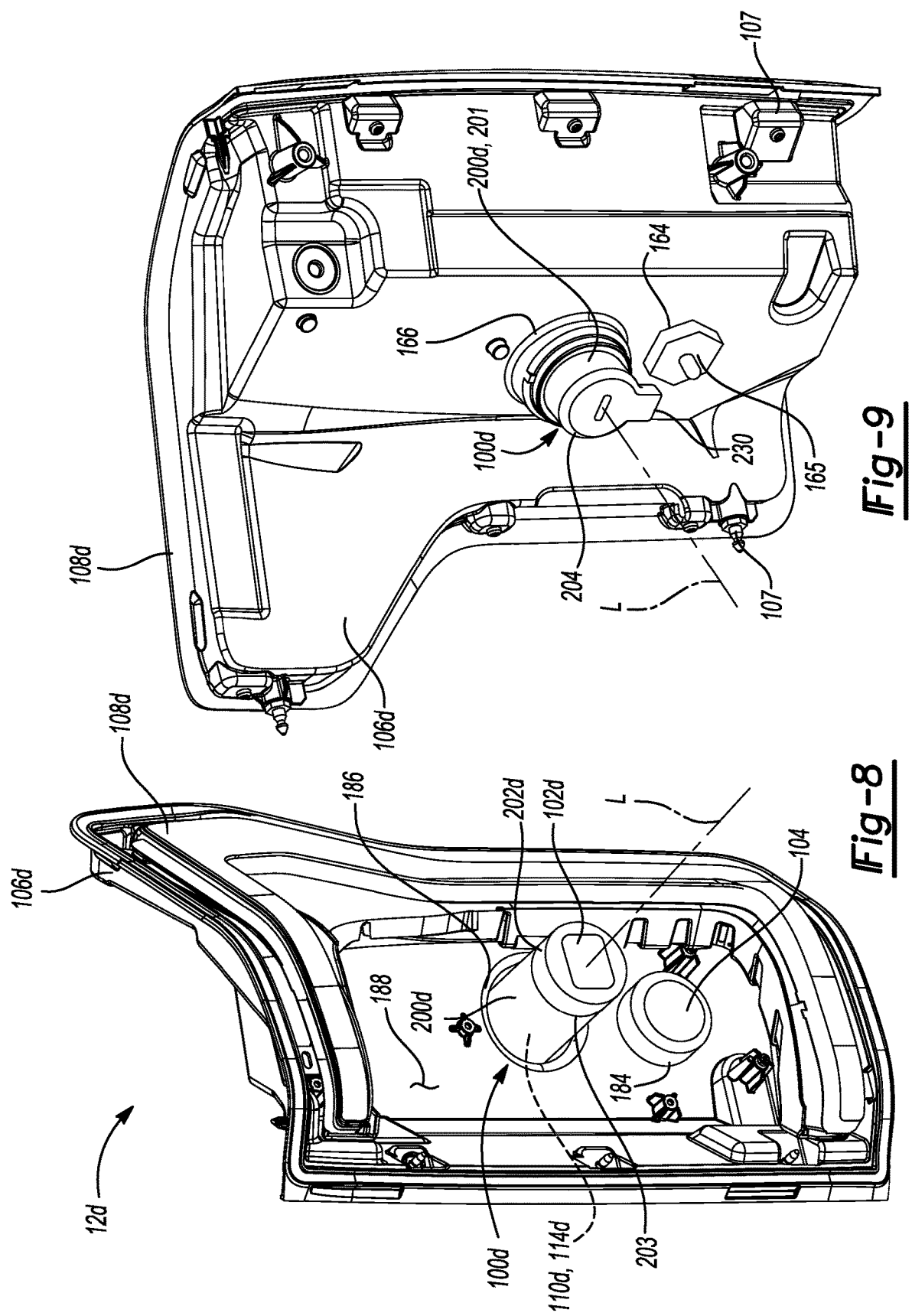

MOUNTING A GESTURE SENSOR PROXIMATE TO A LIGHT ASSEMBLY

FIELD

The present disclosure relates to mounting gesture sensors proximate to vehicle light assemblies.

BACKGROUND

This section provides background information related to the present disclosure and is not necessarily prior art.

Conventional key fobs have been provided for vehicle operators to control door locks, a trunk, a lift gate, remote start features, and/or ambient lighting. However, many times the user may have his/her hands full and it may be difficult for the user to activate buttons on the key fob. Also, the number of controls is limited to the number of buttons that can fit on an ergonomically-sized key fob.

Gesture recognition technology has been applied to vehicle interiors for controlling infotainment systems such as heating/cooling, stereo system, and/or navigation features. It is known to use sensors for detecting gestures executed at or near the sensor when the capacitance of the sensor changes. These sensors, which are capacitance sensors, require power to emit a capacitive field. The capacitive field is configured to detect gestures when the electrical conductivity and dielectric properties of a body part interferes with the capacitive field. Generally, the capacitive field sensitive to detecting the gestures is limited to a small area, one which is proximate to where the capacitance sensor is located. This requires the user to be in close proximity to the sensor in order to successfully execute a gesture capable of being detected. While these small capacitive fields are suitable for detecting hand gestures within vehicle interiors where the location of the user is known, it may be difficult for a user to locate a small capacitive field emitted by a capacitance sensor positioned outside the vehicle.

While the foregoing drawbacks can be alleviated by increasing the coverage of the capacitive field, this typically requires an increase in power consumption and/or the use of additional sensors requiring additional power. For vehicles turned off and parked, this constant power required by the capacitance sensors drains the vehicle battery and can result in the battery depleting. Based on the foregoing, gesture recognition technology may allow a user to control various functions about the vehicle without having to depress buttons on a key fob or locate a mechanical switch, but in order to do so, the user must execute gestures in very close proximity to the location of a gesture sensor, which may difficult for the user during low-light conditions.

SUMMARY

One aspect of the disclosure includes a light assembly having a fixture housing, a gesture sensor assembly, a light source supported by the fixture housing, and a reflector supported by the fixture housing and operative to control direction of light emitted from the light source. The gesture sensor assembly includes a gesture sensor operable to provide a sensing electrical field sensitive to gestures executed a predetermined distance from the gesture sensor.

The reflector may electrically couple to the sensing electrical field to control sensitivity of the sensing electrical field. In some implementations, the gesture sensor assembly includes a printed circuit board (PCB), the gesture sensor including an antenna plate supported by the PCB, and a controller supported by the PCB and operable to control the antenna plate from a de-energized state to an energized state to provide the sensing electrical field. In some examples, the PCB is supported by the reflector and the antenna plate is integrally formed with the PCB. In other examples, the gesture sensor assembly further includes a sensor housing configured to receive the PCB and an antenna wire operatively coupled to the PCB and the antenna plate. In these examples, the antenna plate includes a first end supported by the PCB and a second end extending away from the sensor housing and the antenna wire is operable to receive an electrical signal from the controller to control the antenna plate from the de-energized state to the energized state. The sensor housing may be supported by the fixture housing or the reflector.

In some implementations, the gesture sensor assembly includes a carrier supported by the fixture housing, the gesture sensor including one or more antenna plates supported by the carrier, and a controller supported by the carrier and operably connected to the antenna plates. In these implementations, the controller is operable to control the antenna plates from a de-energized state to an energized state to provide the sensing electrical field. The carrier may define an aperture configured to receive a light source socket supported by the reflector.

In some configurations, the gesture sensor assembly includes a sensor housing defining a longitudinal axis between a first end and a second end, a PCB, the gesture sensor including an antenna plate disposed proximate to the second end of the sensor housing, and a controller supported by the PCB and operatively connected to the antenna plate. In these configurations, the sensor housing defines a receiving slot that extends between the first end of the housing and the second end of the housing and the PCB is received within the receiving slot and defines a length that extends in a first direction substantially parallel to the longitudinal axis of the sensor housing. The controller is operable to control the antenna plate from a de-energized state to an energized state to provide the sensing electrical field. In some examples, the second end of the sensor housing is supported by the reflector and the first end of the sensor housing extends away from the reflector and through an aperture formed through the fixture housing. In other examples, the light assembly further includes a gesture socket supported by the fixture housing and operable to support the sensor housing, whereby the first end of the sensor housing is received by the gesture socket and the second end of the sensor housing extends through an aperture formed through the reflector. The reflector may be electrically coupled to the sensing electrical field and operable to control sensitivity of the sensing electrical field based on a distance between the reflector and the antenna plate.

Another aspect of the disclosure includes a taillight assembly including at least one light source, a reflector operable to control direction of light from the light source, a gesture sensor, and a controller operably connected to the gesture sensor. The gesture sensor is operable to provide a sensing electrical field configured to detect gestures executed a predetermined distance from the gesture sensor. The controller is operable to control the gesture sensor from a de-energized state to an energized state to provide the sensing electrical field. The reflector electrically couples to the sensing electrical field to control sensitivity of the sensing electrical field.

This aspect may include one or more of the following optional features. The gesture sensor may include at least one antenna plate supported by the reflector. In some implementations, the taillight assembly includes a sensor housing configured to support the controller and the gesture sensor. In these implementations, the sensor housing defines a longitudinal axis that extends between a first end and a second end and the gesture sensor includes an antenna plate disposed at the second end of the sensor housing and defines a length that extends in a direction substantially perpendicular to the longitudinal axis. In some examples, the second end of the sensor housing is supported by the reflector and the first end of the sensor housing extends through an aperture formed through a fixture housing that supports the reflector and the light source. In other examples, a fixture housing is configured to support the reflector and the light source, while a gesture socket is supported by the fixture housing. Here, the gesture socket is operative to support the sensor housing by receiving the first end of the sensor housing while the second end of the sensor housing extends through an aperture formed through the reflector. The reflector may control sensitivity of the sensing electrical field based on a distance between the reflector and the antenna plate.

DRAWINGS

The drawings described herein are for illustrative purposes only of selected configurations and are not intended to limit the scope of the present disclosure.

FIGS. 8 and 9 are front (FIG. 8) and rear (FIG. 9) perspective views of a light assembly showing a fixture housing and a reflector with a gesture sensor assembly supported by the fixture housing in accordance with principles of the present disclosure;

Corresponding reference numerals indicate corresponding parts throughout the drawings.

DETAILED DESCRIPTION

Figure 1:
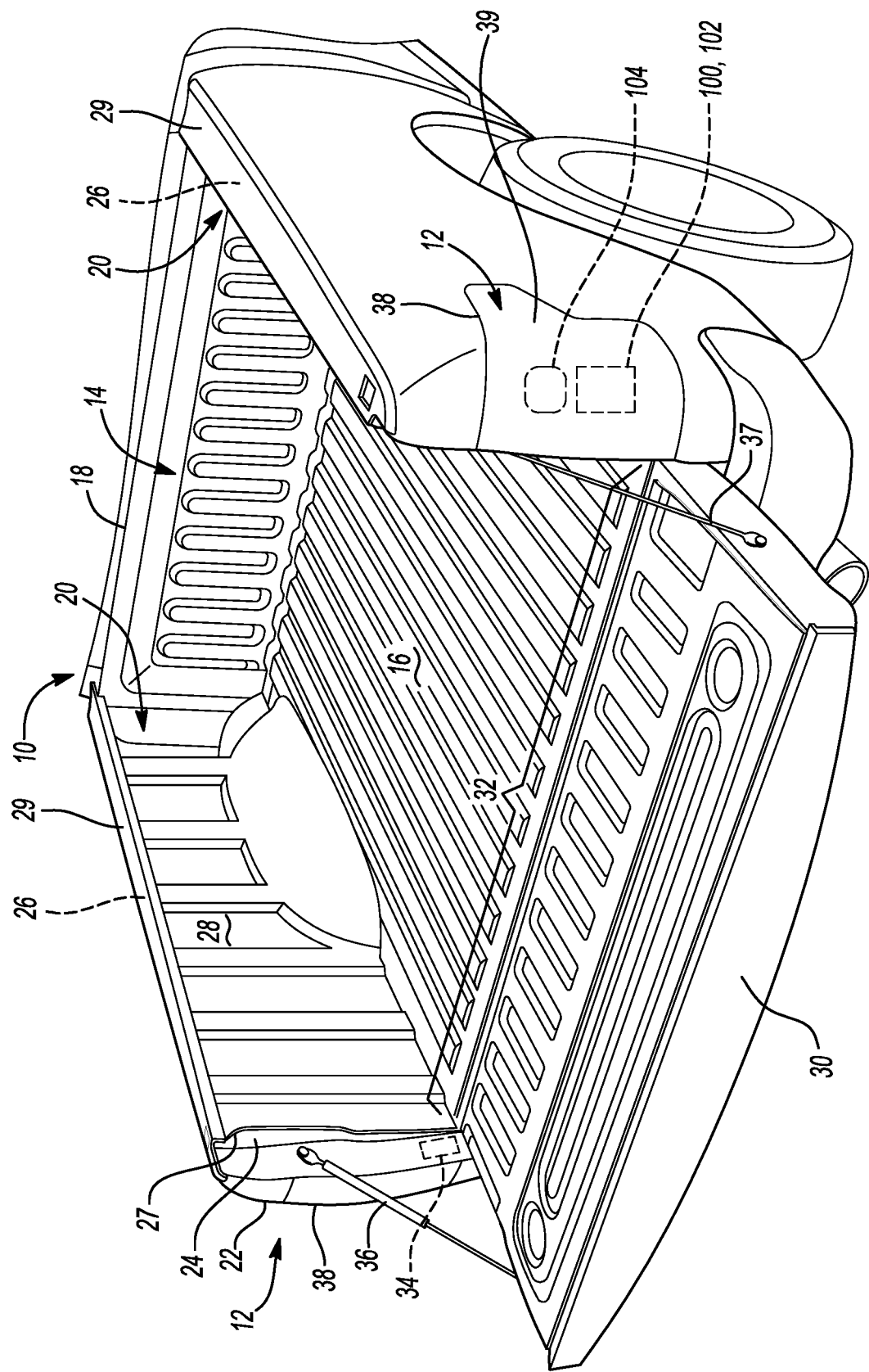
FIG. 1 is a rear perspective view of a vehicle cargo area having taillight assemblies in accordance with principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIG. 1, in some implementations, a vehicle 10 includes a light assembly 12 housing a gesture sensor assembly 100 that includes a gesture sensor 102 operable to provide a sensing electrical field sensitive to gestures executed a predetermined distance from the gesture sensor 102. By executing gestures within the predetermined distance, one or more light sources 104 housed by the light assembly 12 may be controlled from an OFF state to an ON state. The executed gestures may alternatively control other light sources located within a cargo area 14 of the vehicle 10 to illuminate the cargo area 14. The cargo area 14 has a floor 16, a front wall 18, and two sidewalls 20. The floor 16 is substantially parallel to a ground surface, each of the sidewalls 20 extend longitudinally along opposite sides of the floor 16, and the front wall extends laterally along a front side of the floor 16 between the sidewalls 20. The front wall 18 and the sidewalls 20 extend in a direction substantially perpendicular to the floor 16 to define a depth of the cargo area 14.

The cargo area 14 also includes a lift gate 30 disposed between the sidewalls 20 on an opposite side of the floor 16 from the front wall 18 and movable between an open position and a closed position. The lift gate 30 may be rotatably connected to the sidewalls 20 to allow the lift gate 30 to rotatably move relative to the sidewalls 20 about a pivot axis substantially perpendicular to the sidewalls 20. A position sensor 34 may detect the rotatable position of the lift gate 30 to determine whether the lift gate 30 is in the open position, the closed position, or moving therebetween. In some examples, the lift gate 30 is a power lift gate including one or more actuators 36 configured to move the lift gate 30 from the closed position to the open position and vice versa. For instance, each actuator 36 may be a linear actuator having a first end attached to one of the sidewalls 20 and a second end attached to a side of the lift gate 30. In some configurations, executing gestures within the predetermined distance from the light source 104 of the light assembly 12 is operable to control the one or more actuators 36 to move the lift gate 30 between the open and closed positions. Additionally or alternatively, one or more cables 37 may support the lift gate 30 in the open position. The lift gate 30 is substantially coplanar with the floor 16 in the open position to provide accessibility to the cargo area 14 through an opening 32 defined by the floor 16 and the two sidewalls 20. When the lift gate 30 is in the closed position, the lift gate 30 extends in a direction substantially perpendicular to the floor 16 closing the opening 32, and preventing access to the cargo area 14 through the opening 32. The example of FIG. 1 shows the vehicle 10 being a pickup truck and the cargo area 14 corresponding to a cargo bed of the pickup truck. However, in other examples the cargo area 14 and sidewalls 20 can be part of an enclosed cargo area of a van, sport utility vehicle, or other enclosed vehicle structure.

Each sidewall 20 includes a wall structure that may be formed from several panels of sheet metal that are welded, riveted, fastened or otherwise rigidly fixed to one another to define the sidewall 20. Each sidewall 20 includes an exterior surface 22, an inner surface 24 disposed on an opposite side of the sidewall 20 than the exterior surface 22 and opposing the cargo area 14, and a top panel 26 extending between the exterior surface 22 and the inner surface 24. The exterior surfaces 22 of each sidewall 20 may each define a taillight receiving space 38 configured to receive and support the light assembly 12. The example of FIG. 1 shows the light assembly 12 corresponding to a taillight assembly. Accordingly, the terms "light assembly" and "taillight assembly" may be used interchangeably herein. The light assembly 12 housing the gesture sensor assembly 100 may be associated with other lighting assemblies such as headlight assemblies or lighting assemblies for non-vehicular applications. In some configurations, a liner 27 encloses the floor 16, front wall 18, and/or the inner surfaces 24 of the sidewalls 20 to prevent cargo received within the cargo area 14 from directly contacting the floor 16 and interior surfaces 24. The scuff plates 29 may be separate from the liner 27 or, alternatively, may be integrally formed with the liner 27.

In some examples, each light source 104 of the taillight assembly 12 includes a light emitting diode (LED) light device (e.g., lamp) configured to provide illumination while operating in an ON state. In other examples, the one or more light sources 104 include halogen lamps, incandescent lamps, or other lamp types suitable for providing illumination. Typically, light sources 104 associated with taillight assemblies are operative in the ON state to provide illumination during vehicle braking events and/or when the vehicle 10 operates in the reverse direction. In some implementations, the light assembly 12 is adapted to control each light source 104 from the OFF state to the ON state to illuminate the rear of the vehicle 10 without requiring a person to manipulate a mechanical switch. For instance, the light source 104 may switch from operating in the OFF state to operating in the ON state, and thereby provide illumination proximate to the rear of the vehicle 12, responsive to a person executing a gesture within a predetermined range from the taillight assembly 12.

In some examples, the gesture sensor assembly 100 recognizes predefined gestures executed by the person to operate the actuator 36 to move the lift gate 30 from one of the open position or the closed position to the other one of the open position or the closed position. For example, a gesture associated with swiping a hand from up to down may cause the actuator 36 to move the lift gate 30 from the closed position to the open position, i.e., when the position sensor 34 indicates the lift gate 30 is closed. Additionally or alternatively, the gesture sensor assembly 100 may recognize predefined gestures to control one or more light sources within the cargo area 14 to illuminate the cargo area 14.

The taillight assemblies 12 may each include a lens 39 formed from a transparent material that allows light emitted from the light source(s) 104 to pass through the lens 39 and provide illumination about the vehicle exterior. Moreover, the lens 39 may enable activation fields generated by the gesture sensor 102 to pass through the lens 39, thereby causing the gesture sensor 102 to detect executed gestures that enter the activation field.

As mentioned above, the gesture sensor provides a sensing electrical field (e.g., activation field) to detect gestures executed a predetermined distance from the gesture sensor 102, such as a swiping motion executed by a person's hand or a kicking motion executed by the person's foot. In some examples, the gesture sensor 102 includes a capacitance sensor configured to detect gestures executed the predetermined distance from the gesture sensor 102 when the capacitance of the capacitive sensor changes. The gesture sensor 102 may be in the form of an array of one or more antenna plates as shown in a number of different configurations disclosed herein. A controller 110 (FIG. 2) of the gesture sensor assembly 100 may energize the antenna plate(s) 102 using power received from an external power source to cause the plate(s) 102 to emit a capacitive field that extends through the lens 39 by a distance corresponding to the predetermined distance. Here, the capacitive field corresponds to the sensing electrical field, whereby electrical conductivity and dielectric properties of a body part executing a gesture that interferes with the capacitive field causes a change or disturbance in the capacitance of the capacitance field. Accordingly, the gesture sensor 102 may detect gestures executed the predetermined distance from the gesture sensor 102 when capacitance of the emitted capacitance field changes. The gesture sensor 102 may provide feedback to the controller 110 indicating changes in capacitance detected by the gesture sensor 102. In other implementations, the gesture sensor 102 includes an inductive sensor, an optical sensor, an infrared sensor, an ultrasonic sensor, a Doppler sensor, a resistive sensor, or a combination thereof.

Figure 2:
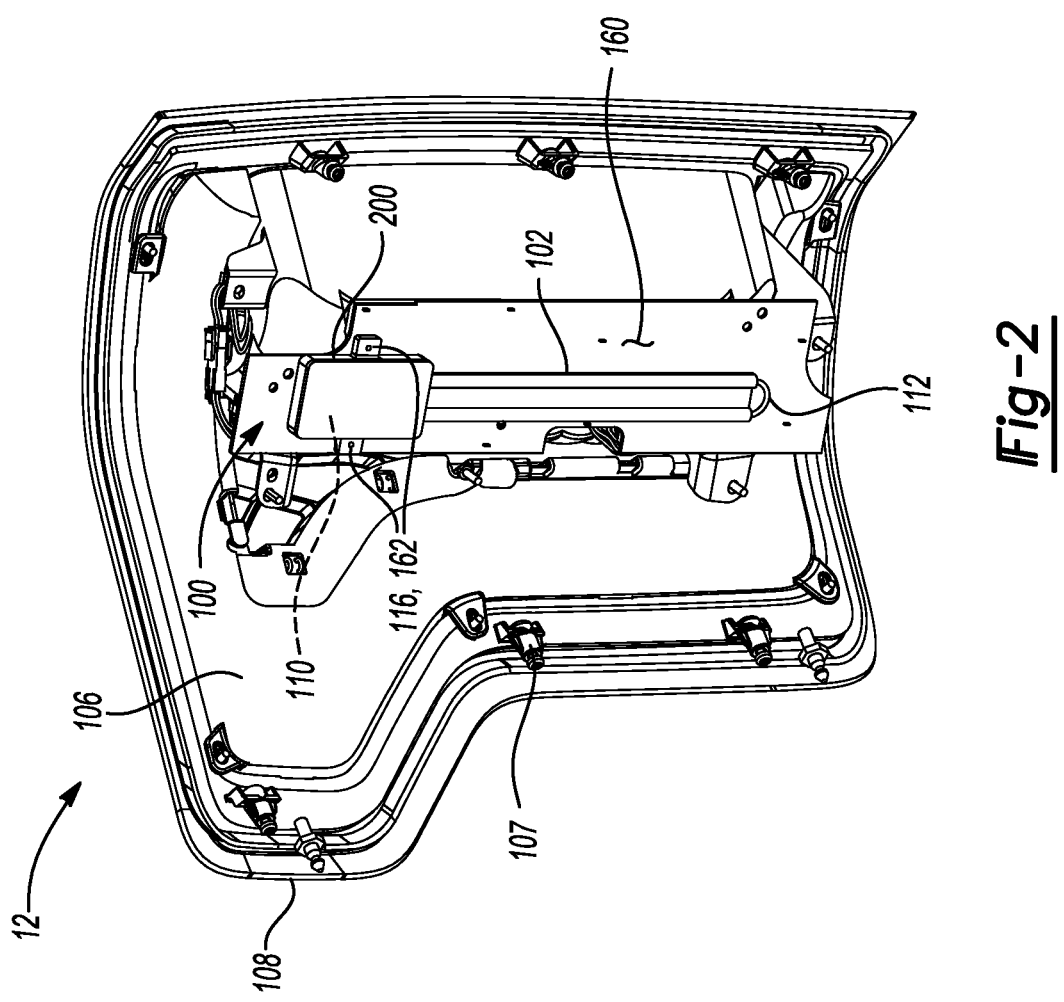
FIG. 2 is a rear perspective view of one of the taillight assemblies of FIG. 1 showing a fixture housing supporting a reflector and a gesture sensor assembly.

Referring to FIG. 2, the taillight assembly 12 includes a fixture housing 106, the gesture sensor assembly 100 including the gesture sensor 102, at least one light source 104 (not shown relative to the view of FIG. 2) supported by the fixture housing 106, and a reflector 108 supported by the fixture housing 106 and configured to control direction of light emitted from the light source 104. The reflector 108 may be formed from reflective and conductive materials for controlling a direction of light emitted from the light source 104. In some implementations, the reflector 108 electrically couples to the sensing electrical field provided by the gesture sensor 102 and is operative to control sensitivity of the sensing electrical field. For instance, the reflector 108 may expand the coverage of the sensing electrical field for detecting gestures.

One or more attachment features 107 may be disposed proximate the outer peripheral edge of the fixture housing 106 and/or the outer peripheral edge of the reflector 108 to assist with securing the reflector 108 to the fixture housing 106 during installation. For instance, the attachment features 107 may be formed from resilient materials and include retention surfaces biased in one direction with respect to the housing 106 that may be pressed to move in the other direction to retain the reflector 108 against the housing 106. The attachment features 107 may include any other type of suitable fasteners for securing the reflector 108 to the fixture housing 106.

The controller 110 of the gesture sensor assembly 100 is operably connected to the gesture sensor 102 and configured to control the gesture sensor 102 from a de-energized state to an energized state to provide the sensing electrical field. In some examples, the controller 110 is operably connected to the light source 104 to control the light source 104 from the OFF state to the ON state when the gesture sensor 102 detects a gesture within the predetermined distance. In other examples, the controller 110 is operably connected to the actuator 36 to control the actuator 36 to move the lift gate 30 from the closed position to the open position when the gesture sensor 102 detects a gesture within the predetermined distance. In these examples, the controller 110 may also be operably connected to the position sensor 34 to control the actuator 36 to open the lift gate 30 when the position sensor 34 indicates the lift gate 30 is in the closed position. Moreover, the controller 110 may be operably connected to other light sources located within the cargo area 14 of the vehicle to illuminate the cargo area 14 when the gesture sensor 102 detects a gesture within the predetermined distance.

In some implementations, the gesture sensor assembly 100 includes a sensor housing 200 configured to house the controller 110 and support the gesture sensor 102. In the example of FIG. 2, the sensor housing 200 is operative to mount the gesture sensor assembly 100 to an interior surface of the fixture housing 106 disposed on an opposite side of the fixture housing 106 than the reflector 108. For instance, the sensor housing 200 may include one or more mounting tabs 116 having holes formed there through for receiving corresponding fasteners 118 (FIG. 3) to fasten the sensor housing 200 to a mounting surface 160 of the fixture housing 106 having corresponding holes 162 configured to receive the fasteners 118.

Figure 3:
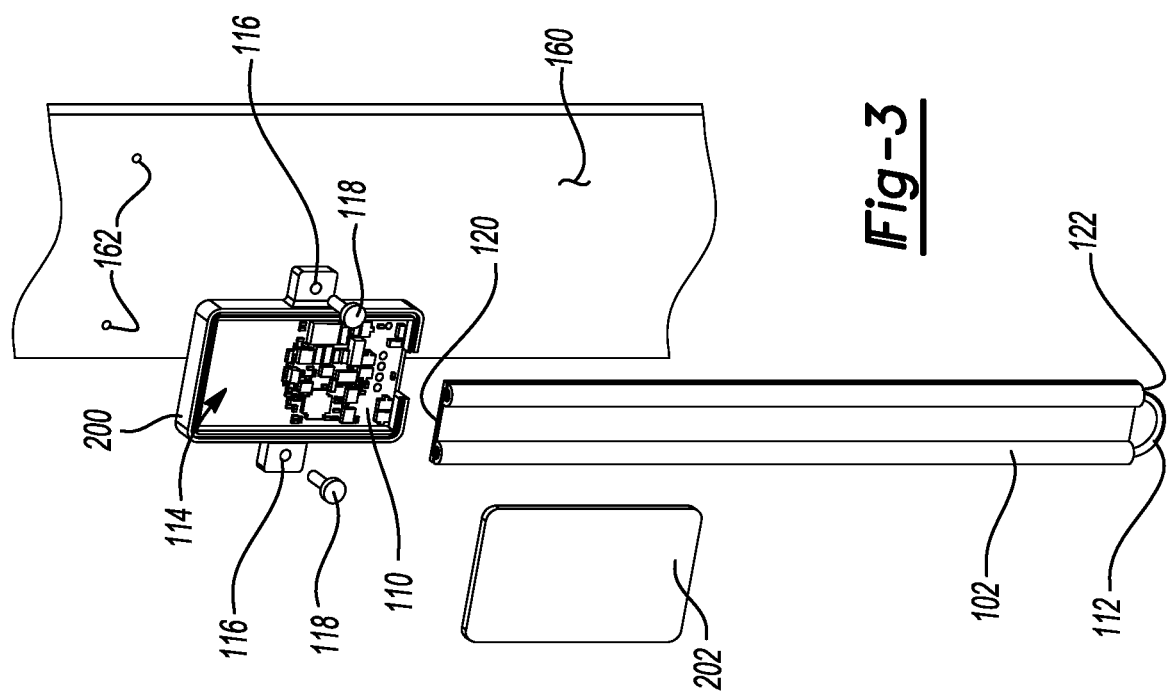
FIG. 3 is an exploded view of the gesture sensor assembly of FIG. 2.

FIG. 3 provides an exploded view of the gesture sensor assembly 100 of FIG. 2 showing the gesture sensor assembly 100 including a printed circuit board (PCB) 114, the gesture sensor 102 in the form of an antenna plate supported by the PCB 114, and the controller 110 supported by the PCB 114 and operatively connected to the antenna plate 102. Here, the sensor housing 200 is configured to receive the PCB 114 and support the antenna plate 102 (e.g., the gesture sensor). For instance, the antenna plate 102 includes a first end 120 supported by the PCB 114 and a second end 122 extending away from the sensor housing 200. Moreover, an antenna wire 112 operatively coupled to the PCB 114 and the antenna plate 102 is operable to receive an electrical signal from the controller 110 to control the antenna plate 102 from the de-energized state to the energized state. A lid/cover 202 may secure to an open end of the housing 200 to enclose the controller 110 and the PCB 114 therein.

The PCB 114 may include a substrate that supports the controller 110 thereon. The controller 110 may be disposed upon any substrate surface of the PCB 114. In some examples, the controller 110 includes a microprocessor, microcontroller, digital signal processor or other programmable device. The controller 110 may correspond to an integrated circuit having a set of electronic circuits disposed on a chip (e.g., microchip) formed from one or more semiconductor materials, such as silicon. The substrate of the PCB 114 may include control circuitry such as conductor paths formed thereon configured to operably connect the controller 110 to a power-communication terminal. The PCB 114 may also include additional control circuitry such as switches, relays, transistors, diodes, etc. used to control the flow of power and/or communication paths between the controller 110 and the antenna plate 102. The PCB 114 may include a power-communication terminal for electrically connecting the PCB 114 to an external power source. The external power source may include a vehicle battery or may include an electrical socket of the taillight assemblies 12 powered by the vehicle battery. Thus, electrical power received at the power-communication terminal of the PCB 114 may be used by the controller 110 for energizing the antenna plate 102.

Figure 4:
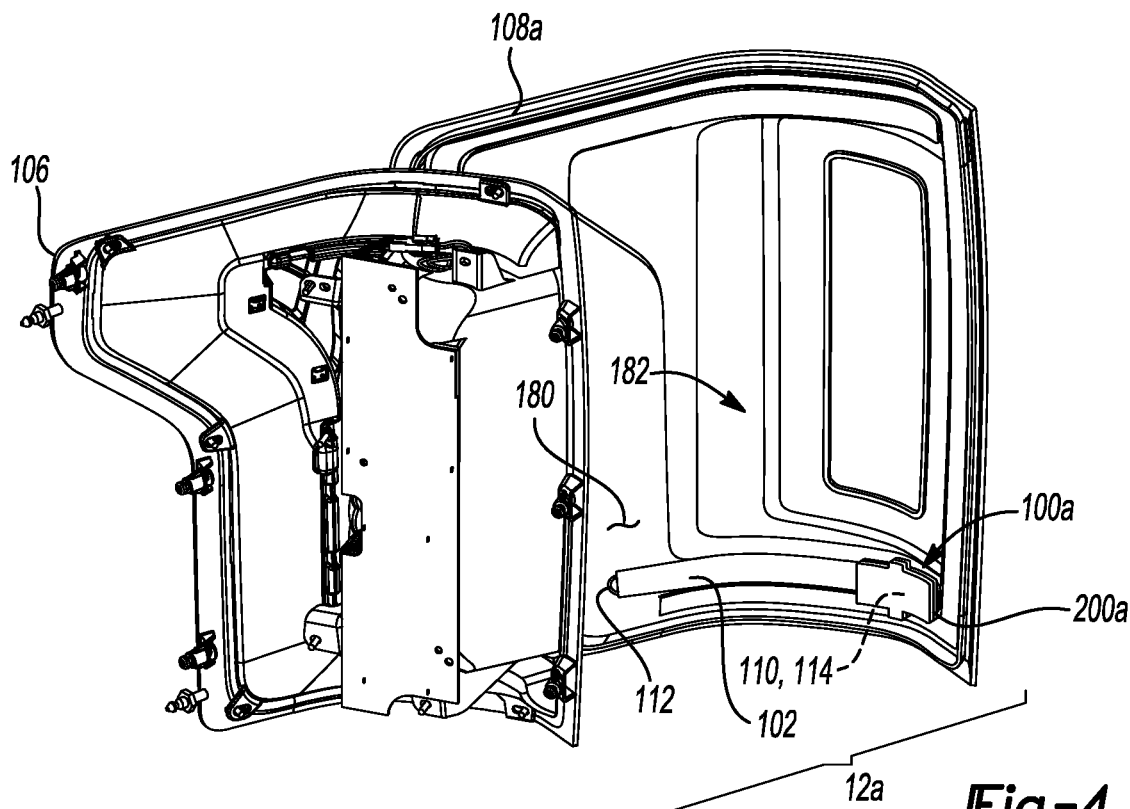
FIG. 4 is an exploded view of a light assembly showing a fixture housing and a reflector, with a gesture sensor assembly disposed within a receiving space between the fixture housing and the reflector in accordance with principles of the present disclosure.

Referring to FIG. 4, an exploded view of a light assembly 12a is provided and includes a fixture housing 106, a reflector 108a supported by the fixture housing 106, a gesture sensor assembly 100a disposed between the reflector 108a and the fixture housing 106, and the light source 104 (not shown relative to view of FIG. 4). In view of the substantial similarity in structure and function of the components associated with the light assembly 12 with respect to the light assembly 12a, like reference numerals are used hereinafter and in the drawings to identify like components while like reference numerals containing letter extensions are used to identify those components that have been modified.

As with the gesture sensor assembly 100 of FIGS. 1-3, the gesture sensor assembly 100a includes the PCB 114, the antenna plate 102 (i.e., gesture sensor) supported by the PCB 114, and the controller 110 supported by the PCB 114 and operative to control the antenna plate 102 from a de-energized state to an energized state to provide the sensing electrical field. In some implementations, a sensor housing 200a receives the PCB 114 and the controller 110. By contrast to the sensor housing 200 of FIGS. 1-3 that is supported by the fixture housing 106, the sensor housing 200a is operative to mount the gesture assembly 100a on an interior surface 180 of the reflector 108a disposed on a side of the reflector 108a that opposes the fixture housing 106. For instance, the reflector 108a may define a receiving area 182 for receiving the gesture sensor assembly 100a such that the sensor housing 200a fastens to the interior surface 180 of the reflector 108a in a manner substantially similar to how the sensor housing 200 mounts to the mounting surface 160 of the fixture housing 106 of FIGS. 2 and 3.

In other implementations (not shown), the sensor housing 200a is omitted and the PCB 114 is directly supported by the interior surface 180 of the reflector 108a. For instance, adhesives or other fastening techniques may be used to secure the PCB 114 to the interior surface 180 of the reflector 108a. In these implementations, the fixture housing 106 and the reflector 108a may cooperate to enclose the gesture sensor assembly 100a within the receiving area 182 such that the controller 110 and/or PCB 114 are sealed within the light assembly 12a and protected unintentional contact when the light assembly 12a is attached to the vehicle 12. By mounting the gesture sensor 102 in close proximity to the reflector 108a, the entire surface of the reflector 108a may couple to the sensing electrical field to increase the sensitive area thereof, thereby allowing the reflector 108a to cooperate with the gesture sensor 102 to receive and detect executed gestures.

Figure 5:
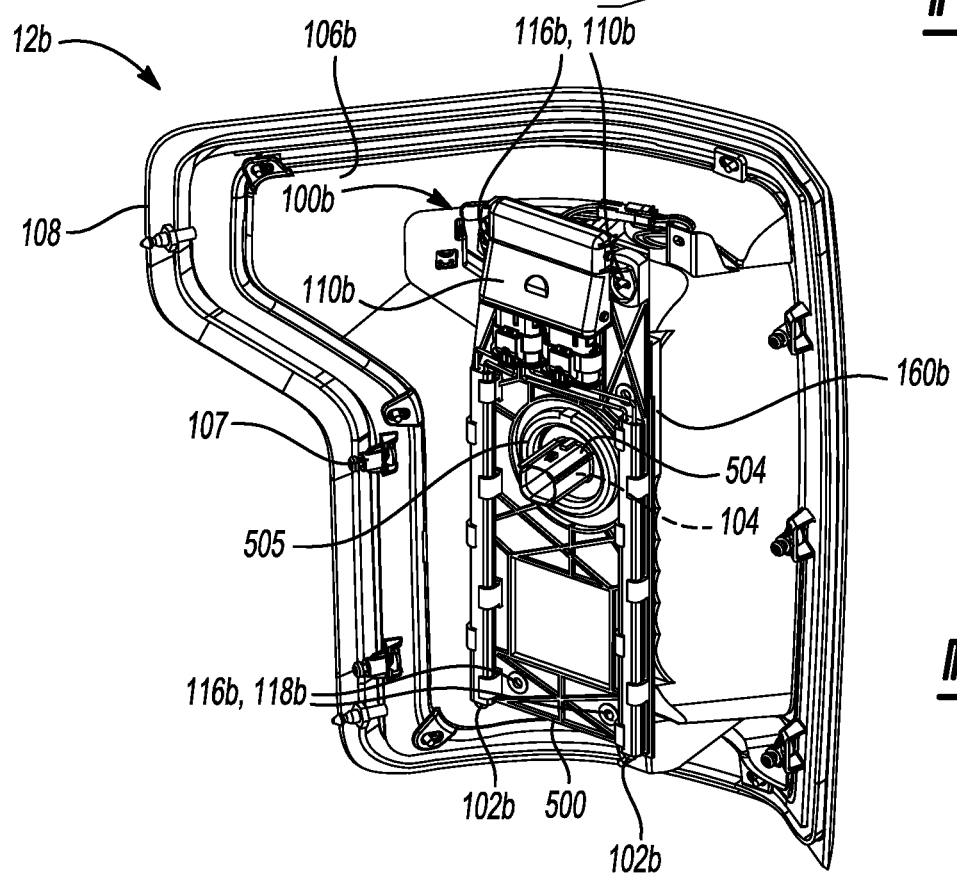
FIG. 5 is a rear perspective view of a light assembly showing a fixture housing and a reflector, with a gesture sensor assembly supported by the fixture housing in accordance with principles of the present disclosure.
Figure 6:
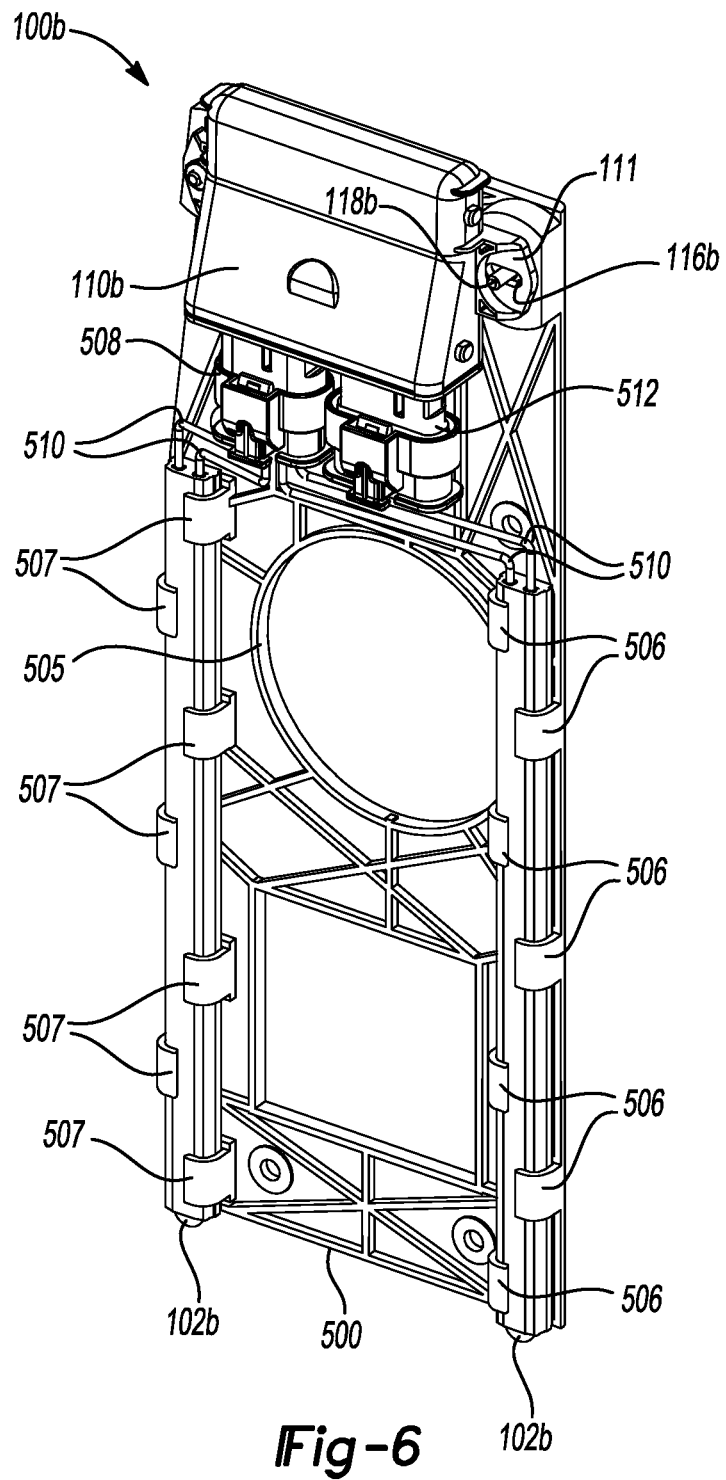
FIG. 6 is a perspective view of the gesture sensor assembly of FIG. 5 showing a carrier supporting a controller and a pair of antenna plates.

Referring to FIGS. 5 and 6, a light assembly 12b is provided and includes a fixture housing 106b, a reflector 108 supported by the fixture housing 106b, a gesture sensor assembly 100b supported by the fixture housing 106b, and the light source 104 (not shown relative to view of FIG. 5). In view of the substantial similarity in structure and function of the components associated with the light assembly 12 with respect to the light assembly 12b, like reference numerals are used hereinafter and in the drawings to identify like components while like reference numerals containing letter extensions are used to identify those components that have been modified.

The reflector 108 is formed from conductive and reflective material(s) to control the direction of light from the light source 104. The reflector 108 may attach to the fixture housing 106b using the one or more attachment features 107 operable to retain the reflector 108 against the fixture housing 106b. The fixture housing 106b may also support a peripheral edge of the lens 39 for enclosing the reflector 108 between the lens 39 and the fixture housing 106b. As with the gesture sensor assembly 100 of FIGS. 1-3, the gesture sensor assembly 100b includes a gesture sensor 102b operable to provide a sensing electrical field that is sensitive to gestures executed a predetermined distance from the gesture sensor 102. In some scenarios, the reflector 108 is electrically coupled to the sensing electrical field and operable to control sensitivity of the sensing electrical field.

The gesture sensor assembly 100b includes a carrier 500 supported by the fixture housing 106b, the gesture sensor 102b in the form of one or more antenna plates supported by the carrier 500, and a controller 110b supported by the carrier 500 and operably connected to the antenna plates. More particularly, the controller 110b is operative to control the antenna plates 102b (i.e., the gesture sensor) from a de-energized state to an energized state to provide the sensing electrical field. The controller 110b may include a microprocessor, microcontroller, digital signal processor or other programmable device.

The example of FIGS. 5 and 6 shows the gesture sensor 102b corresponding to two antenna plates; however, other configurations may include one antenna plate or three or more antenna plates capable of being energized to provide the sensing electrical field. The carrier 500 is operative to mount the gesture sensor assembly 100b on an interior surface of the fixture housing 106b disposed on an opposite side of the fixture housing 106b than a side opposing the reflector 108. For instance, the carrier 500 may include one or more mounting holes 116b for receiving corresponding fasteners 118b to fasten the carrier 500 to a mounting surface 160b of the fixture housing 106b. In some examples, the controller 110b includes one or more mounting bosses 111 (FIG. 6) having holes formed therethrough for receiving the fasteners 118b to mount both the controller 110b and the carrier 500 to the fixture housing 110b. Accordingly, the carrier 500 may be disposed between the mounting surface 160b of the fixture housing 106b and the controller 110b. In some examples, the carrier defines an aperture 505 configured to receive a light source socket 504 supported by the fixture housing 106b. The light source socket 504 may be adapted to receive and provide power to the light source 104 for providing illumination.

FIG. 6 provides an exploded view of the gesture sensor assembly 100b of FIG. 5 showing the gesture sensor assembly 100b including the carrier 500, the gesture sensor 102b in the form of the antennal plates supported by the carrier 500, and the controller 110b supported by the carrier 500 and operative to control the antenna plates 102b (i.e., the gesture sensor) from the de-energized state to the energized state to provide the sensing electrical field. The carrier 500 may include a first series of tabs 506 adapted to receive and support one of the longitudinally extending antenna plates 102b. The carrier 500 may also include a second series of tabs 507 adapted to receive and support the other one of the longitudinally extending antenna plates 102b. The tabs 506, 507 may be arranged along opposite edges of the carrier 500 and extend substantially parallel to one another such that the antenna plates 102b are parallel to one another while supported by the carrier 500.

In some configurations, the controller 110b includes a first power-communication terminal 508 operative to operatively connect the controller 110b to each of the antenna plates 102b via one or more conductors 510. For example, the controller 110b may provide power through the first power-communication terminal 508 and to the antenna plates 102b via the conductors 510 to control the antenna plates 102b from the de-energized state to the energized state to provide the sensing electrical field. Similarly, the antenna plates 102b may provide feedback to the controller 110b through the first power-communication terminal 508 indicating the detection of gestures interfering with the sensing electrical field. The controller 110b may also include a second power-communication terminal 512 operative to operatively connect the controller 110b to the external power source and other components of the vehicle 10. For example, the light source socket 504 may route power from the external power source to the controller 110b via the second power-communication terminal 512 for use by the controller 110b when energizing the antenna plates 102b. In other examples, the controller 110b may receive power from the external power source via one or more wires connected to the second power-communication terminal 512. In some examples, the controller 110b communicates through the power-communication terminal 512 to control the light source 104 from the OFF state to the ON state when the predetermined gestures are detected by the antenna plates 102b. The controller 110b may include other power communication terminals for receiving power from an external power source, such as a standard 12 V battery of the vehicle 12.

Figure 7:
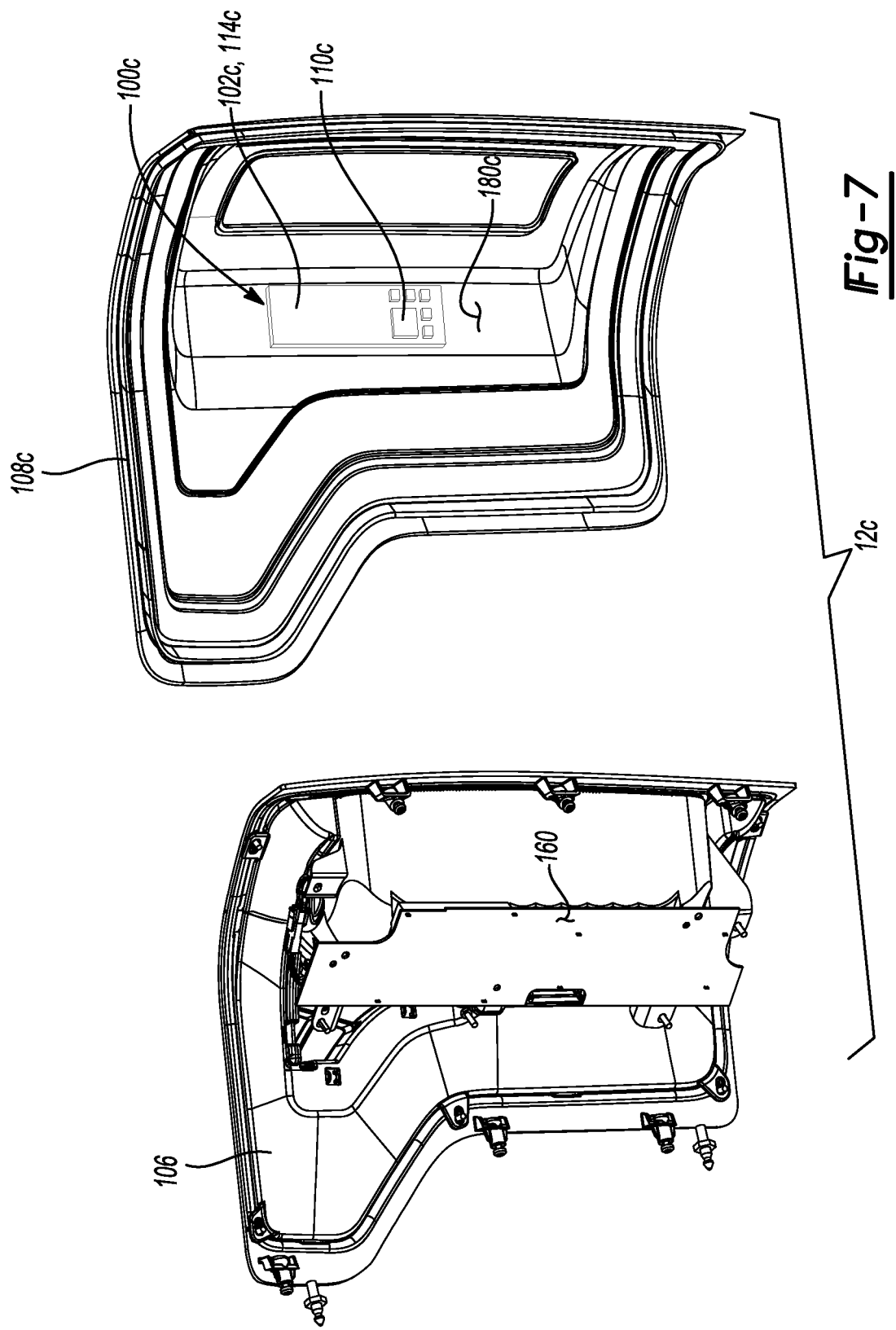
FIG. 7 is an exploded view of a light assembly showing a reflector supporting a gesture sensor assembly including an antenna plate integrally formed with a printed circuit board in accordance with principles of the present disclosure.

Referring to FIG. 7, an exploded view of a light assembly 12c is provided and includes a fixture housing 106, a reflector 108c supported by the fixture housing 106, a gesture sensor assembly 100c disposed between the reflector 108c and the fixture housing 106, and the light source 104 (not shown relative to view of FIG. 7). In view of the substantial similarity in structure and function of the components associated with the light assembly 12 with respect to the light assembly 12c, like reference numerals are used hereinafter and in the drawings to identify like components while like reference numerals containing letter extensions are used to identify those components that have been modified.

The gesture sensor assembly 100c includes a PCB 114c, a gesture sensor 102c in the form of an antenna plate, and a controller 110c supported by the PCB 114c and operative to control the antenna plate 102c (i.e., the gesture sensor) from a de-energized state to an energized state to provide the sensing electrical field. The configuration of FIG. 7 shows the PCB 114c supported by the reflector 108c upon an interior surface 180c and integrally formed with antenna plate 102b. For example, the antenna plate 102b may function as both a substrate of the PCB 114c for supporting the controller 110c thereon and as the gesture sensor 102b for providing the sensing electrical field when energized. As set forth above, the controller 110c may include the programmable device such as the microprocessor, microcontroller, or digital signal processor, or may correspond to the integrated circuit having the set of electronic circuits disposed on the chip.

The PCB 114c may also include additional control circuitry such as switches, relays, transistors, diodes, etc. used to control the flow of power and/or communication paths between the controller 110c and the antenna plate 102c. The PCB 114c may include a power-communication terminal for electrically connecting the PCB 114c to the external power source. The external power source may include the vehicle battery or may include the electrical socket of the tail light assembly 12c powered by the vehicle battery. Thus, electrical power received at the power-communication terminal of the PCB 114c may be used by the controller 110c for energizing the antenna plate 102c.

Adhesives or other fastening techniques may be used to secure the integrally formed PCB 114c and antenna plate 102c to the interior surface 180c of the reflector 108c. In these implementations, the fixture housing 106 and the reflector 108c may cooperate to enclose the gesture sensor assembly 100c such that the gesture sensor assembly 100c is sealed within the light assembly 12c and protected from unintentional contact when the light assembly 12c is attached to the vehicle 12 during installation.

As the reflector 108c is formed from conductive and reflective material(s) to control direction of light from the light source 104, the reflector 108c may also electrically couple to the sensing electrical field and operate to control sensitivity of the sensing electrical field. By mounting the antenna plate 102c directly to the reflector 108c (e.g., upon the interior surface 180c), the entire surface of the reflector 108c may couple to the sensing electrical field to increase the sensitive area thereof, and thereby allow the reflector 108c to cooperate with the antenna plate 102c to sense the executed gestures that interfere with the sensing electrical field. In some examples, it is desirable to localize a sensitivity of the sensing electrical field to specific portions of the reflector 108c. Here, the position/orientation of the antenna plate 102c relative to the reflector 108c may be selected to achieve a desired level of sensitivity of the sensing electrical field by allowing the sensing electrical field to couple to all or portions of the reflector 108c while preventing the sensing electrical field from coupling to other areas of the light assembly 12c. Additionally, electrical grounding may be incorporated by the light assembly 12c to localize the sensitive area of the sensing electrical field.

Referring to FIGS. 8-11, a light assembly 12d is provided and includes a fixture housing 106d supporting a reflector 108d, a gesture sensor assembly 100d, and the light source 104. In view of the substantial similarity in structure and function of the components associated with the light assembly 12 with respect to the light assembly 12d, like reference numerals are used hereinafter and in the drawings to identify like components while like reference numerals containing letter extensions are used to identify those components that have been modified.

FIG. 8 provides a front perspective view of the light assembly 12d showing the reflector 108d defining a light source opening 184 exposing the light source 104 and a gesture sensor opening 186 exposing at least a portion of the gesture sensor assembly 100d. The front perspective view of the light assembly 12d of FIG. 8 corresponds to a view of the light assembly 12d from outside the vehicle 10 when the light assembly 12d is received and supported by the tail light receiving space 38 of the vehicle 10. Accordingly, the reflector 108d includes an exterior surface 188 facing toward the exterior of the vehicle 10 and disposed on an opposite side of the reflector 108d than an interior surface facing toward, and substantially covered by, the fixture housing 106d. The reflector 108d may attach to the fixture housing 106d using one or more attachment features 107 that may include the retention surfaces biased in one direction and pressed in the other direction to retain the reflector 108d against the fixture housing 106d. The reflector 108d may be formed form the conductive and reflective materials that form the reflector 108 of the light assembly 12 of FIGS. 1-3, and therefore, the reflector 108d may control direction of light emitted from the light source 104.

FIG. 9 provides a rear perspective view of the light assembly 12d showing the fixture housing 106d defining a light source opening 164 and a gesture sensor opening 166 each aligning with corresponding ones of the light source opening 184 and the gesture sensor opening 186 formed through the reflector 108d when the reflector 108d attaches to the fixture housing 106d. Here, the light source opening 164 supports a light source socket 165 supporting the light source 104 and the gesture sensor opening 166 supports a gesture socket 204 operable to support a sensor housing 200d of the gesture sensor assembly 100d. The rear perspective view of the light assembly 12d of FIG. 9 is concealed from outside the vehicle 10 when the light assembly 12d is received and supported by the tail light receiving space 38 of the vehicle 10.

Referring to FIGS. 8 and 9, the gesture sensor housing 200d defines a longitudinal axis L that is substantially coaxial with the gesture sensor openings 166 and 186 when the gesture sensor assembly 100d is received by the openings 166 and 186. The gesture sensor assembly 100d includes the gesture socket 204, the sensor housing 200d, a PCB 114d, and the gesture sensor 102d. The sensor housing 200d is operative to contain the PCB 114d and support the gesture sensor 102d. The sensor housing 200d defines a length extending along the longitudinal axis L from a first end 201 received by the gesture socket 204 to a second end 203 extending through the gesture sensor opening 186 formed through the reflector 108d. The gesture sensor 102d includes an antenna plate 102d disposed proximate to the second end 203 of the sensor housing 200d. In some configurations, the gesture sensor assembly 100d includes a cover 202d releasably attached to the second end 203 of the sensor housing 200d to enclose the PCB 114d therein and operative to support the antenna plate 102d.

In some examples, the gesture sensor assembly 100d includes the PCB 114d having a substrate the supports the controller 110d. As described above with reference to the gesture sensor assembly 100 of FIGS. 1-3, the controller 110d is operative to control the antenna plate 102d from the de-energized state to the energized state to provide the sensing electrical field sensitive to gestures executed a predetermined distance from the antenna plate 102d, and may include the programmable device or the integrated circuit disposed on the chip (e.g., microchip). The PCB 114d may include control circuitry such as conductor paths formed thereon and configured to operably connect the controller 110d to the antenna plate 102d to control the antenna plate 102d from the de-energized state to the energized state for providing the sensing electrical field. The PCB 114d may also include additional control circuitry such as switches, relays, transistors, diodes, etc. used to control the flow of power and/or communication paths between the controller 110, the antenna plate 102d, the light source(s) 104, and/or the actuator 36 for opening/closing the lift gate 30 in response to user gestures executed at or near the antenna plate 102d when in the energized state and providing the sensing electrical field.

As the reflector 108d is formed from conductive and reflective material(s) to control direction of light from the light source 104, the reflector 108d may also electrically couple to the sensing electrical field and operate to control sensitivity of the sensing electrical field. The position/orientation of the exterior surface 188 of the reflector 108d relative to the antenna plate 102d may be selected to control the sensitivity of the sensing electrical field when the antenna plate 102d is energized. For instance, the sensitivity of the sensing electrical field decreases as a distance between the exterior surface 188 of the reflector 108d and the antenna plate 102d increases, and the sensing electrical field increases as the distance between the exterior surface 188 of the reflector 108d and the antenna plate 102d decreases. Thus, the distance between the antenna plate 102d and the reflector 108d may be selected to localize sensitivity of the sensing electrical field to desired areas of the light assembly 12d.

Figure 10:
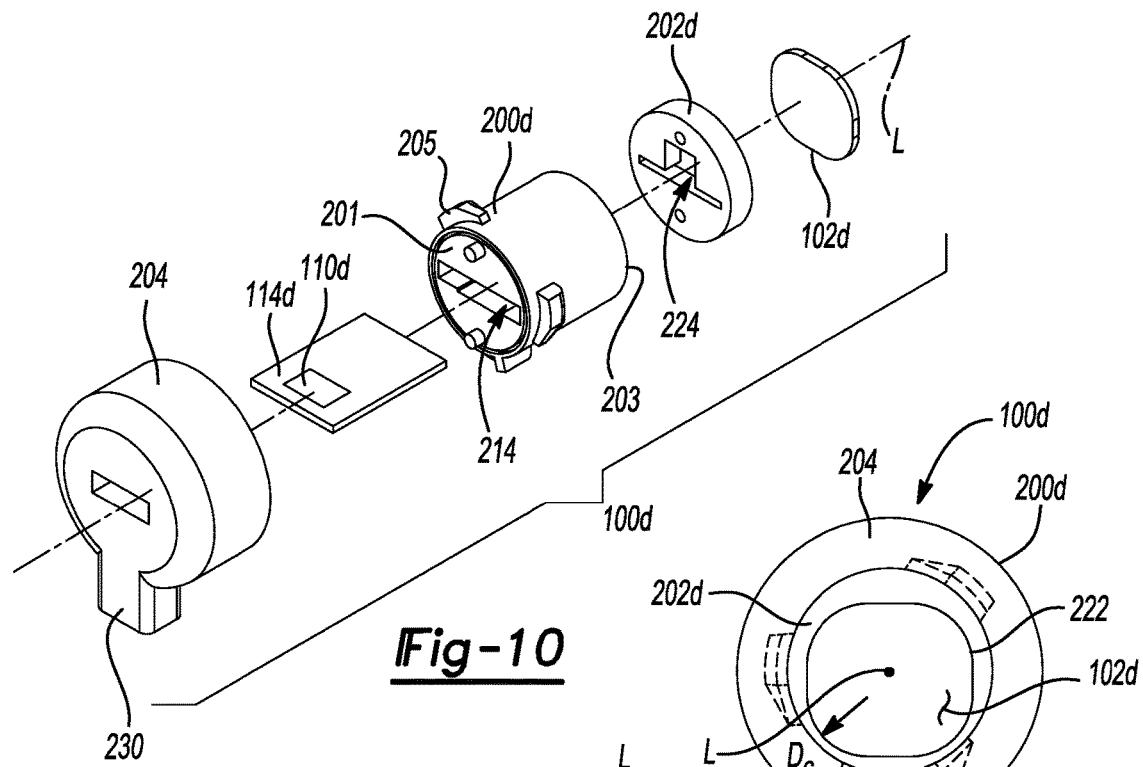
FIG. 10 is an exploded view of the gesture sensor assembly of FIGS. 8 and 9 showing a gesture socket, a sensor housing receiving a printed circuit board, and a cover supporting an antenna plate.

FIG. 10 provides an exploded view of the gesture sensor assembly 100d of FIGS. 9 and 10. The sensor housing 200d may include engagement features 205 configured to engage with corresponding engagement features of the gesture socket 204 to releasably fasten the sensor housing 200d to the gesture socket 204. The example of FIG. 10 shows the engagement features 205 including a plurality of tabs circumferentially spaced around an outer periphery of the sensor housing 200d that may engage with corresponding slots formed in the gesture socket 204. In other examples, the engagement features 205 may include threads for providing threaded engagement with corresponding threads of the gesture socket 204. The gesture socket 204 may include a power-communication terminal 230 for providing power to the controller 110d for energizing the antenna plate 102d as well as for directing communications from the controller 110d for controlling one or more of the light source(s) 104, the lift gate actuator 36, or other light sources in response to user gestures executed at or near the gesture sensor 102d.

The sensor housing 200d defines a receiving slot 214 that extends between the first end 201 of the sensor housing 200d and the second end 203 of the sensor housing 200d. The PCB 114d is received by the receiving slot 214 and defines a length extending in a first direction substantially parallel to the longitudinal axis L. The antenna plate 102d disposed proximate to the second end 203 of the sensor housing 200d defines a length that extends in a second direction substantially perpendicular to the longitudinal axis L. Accordingly, the planar extents of the antenna plate 102d and the PCB 114d are substantially perpendicular to one another. In some examples, the length of the PCB 114d is greater than the length of the sensor housing 200d and therefore extends through the receiving slot 214 and away from the second end 203 of the sensor housing 200d. Here, the cover 202d may define a secondary receiving slot 224 operative to receive a portion of the length of the PCB 114d that extends beyond the second end 203 of the sensor housing 200d when the cover 202d attaches to the second end 203 of the sensor housing 200d.

Figure 11:
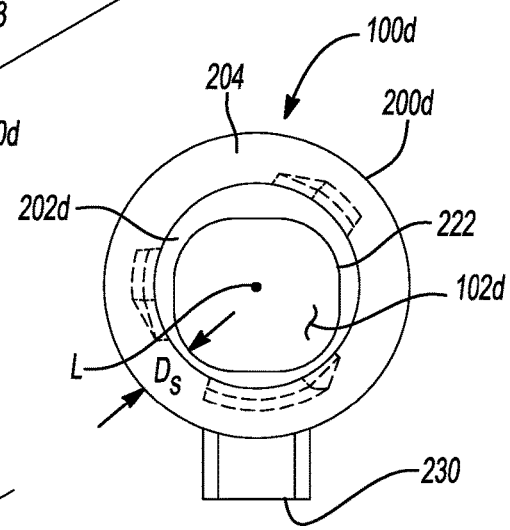
FIG. 11 is a front view of the gesture sensor assembly of FIGS. 8 and 9 showing an antenna plate received within a receiving slot of a cover.

Referring to FIG. 11, a front view of the gesture sensor assembly 100d is provided and shows a front face of the cover 202d defining an antenna slot 222 operative to receive and retain the antenna plate 102d and the cover 202d. In some examples, the antenna plate 102d is substantially flush with the front face of the cover 202d when received by the antenna slot 222 A separation distance Ds between an outer circumference of the cover 202d and the antenna plate 102d may also control sensitivity of the sensing electrical field. For instance, the sensitivity of the sensing electrical field decreases as the Ds between the outer circumference of the cover 202d and the antenna plate 102d increases, and the sensing electrical field increases as the Ds between the outer circumference of the cover 202d and the antenna plate 102d decreases. In some examples, the cover 202d may be formed from insulating materials operative to prevent the reflector 108d from electrically coupling to the sensing electrical field. Accordingly, the sensing electrical field provided by the energized antenna plate 202d may be localized to an area immediately in front of the antenna plate 102d.

Figure 12:
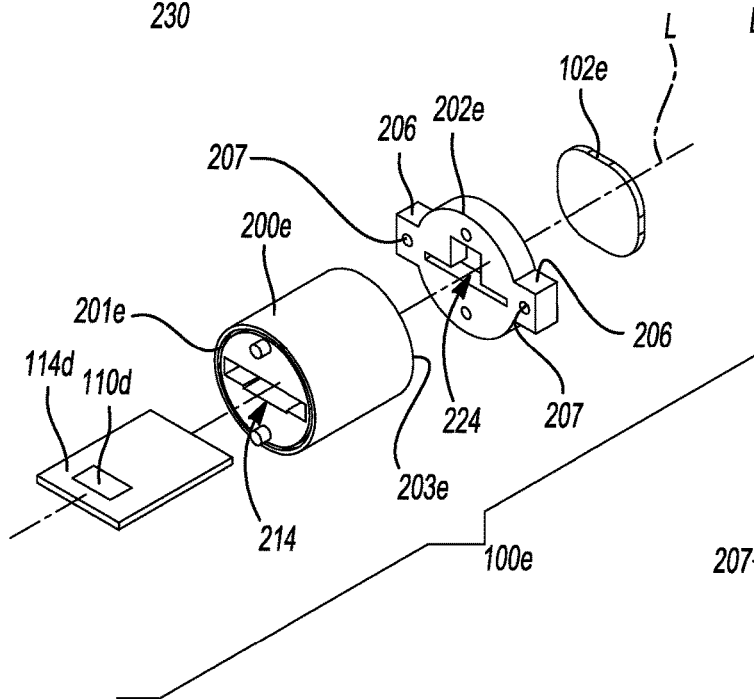
FIG. 12 is an exploded view of a gesture sensor assembly showing a sensor housing receiving a printed circuit board, a cover, and an antenna plate in accordance with principles of the present disclosure.
Figure 13:
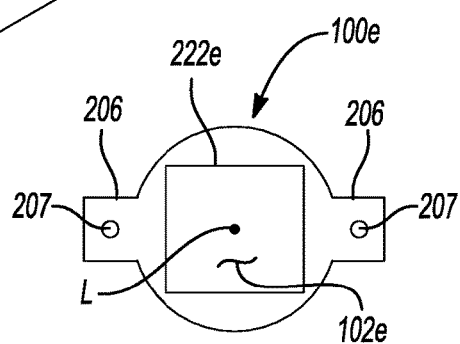
FIG. 13 is a front view of the gesture sensor assembly of FIG. 12 showing the antenna plate received within a receiving slot of the cover.

Referring to FIGS. 12 and 13, a gesture sensor assembly 100e is provided and includes a sensor housing 200e, a PCB 114d, a gesture sensor 102e in the form of an antenna plate, a cover 202e, and the controller supported by the PCB 114d and operatively connected to the antenna plate 102e (i.e., the gesture sensor). In view of the substantial similarity in structure and function of the components associated with the gesture sensor assembly 100e with respect to the gesture sensor assembly 100d of FIGS. 8-11, like reference numerals are used hereinafter and in the drawings to identify like components while like reference numerals containing letter extensions are used to identify those components that have been modified.

The gesture sensor assembly 100e may alternatively be incorporated by the light assembly 12d of FIGS. 8-11 in place of the gesture sensor assembly 100d. Conversely to the fixture housing 106d supporting the gesture sensor assembly 100d of FIGS. 8-11, the reflector 108d is operative to support the gesture sensor assembly 100e. The sensor housing 200e defines a length extending along a longitudinal axis L between a first end 201e and a second end 203e. The first end 201e of the sensor housing 200e extends away from the reflector 108d and through the gesture sensor opening 166 formed through the fixture housing 106d. The first end 201e may optionally extend through a different hole/aperture formed through the fixture housing 106d at a different location then the gesture sensor opening 166 shown in FIG. 9. The second end 203e of the sensor housing is supported by the reflector 108d and disposed proximate to the exterior surface 188 of the reflector 108*d*. More particularly, the cover 202*e* releasably attaches to the second end 203*e* of the sensor housing 200*e* and is operative to releasably fasten to the reflector 108*d* to support the gesture sensor assembly 100*e* thereon. For example, the cover 202*e* may include one or more fastener tabs 206 having corresponding holes 207 formed therethrough for receiving fasteners to secure/mount the cover 202*e* to the reflector 108*d*. In some examples, the cover 202*e* fastens to an interior surface of the reflector 108*d* (omitted from the view of FIGS. 8 and 9) disposed on an opposite side of the reflector 108*d* than the exterior surface 188. In other examples, the cover 202*e* fastens to the exterior surface 188 of the reflector 108*d*.

FIG. 12 provides an exploded view of the gesture sensor assembly 100*e* showing the sensor housing 200*e* defining the receiving slot 214 that extends along the longitudinal axis L between the first end 201*e* of the sensor housing 200*e* and the second end 203*e* of the sensor housing 200*e*. The PCB 114*d* is received by the receiving slot 214 of the sensor housing 200*e* and the antenna plate 102*e* is retained by the cover 202*e* proximate to the second end 203*e* of the sensor housing 200*e* and extends in the second direction substantially perpendicular to both the PCB '14*d* and the longitudinal axis L. In some examples, the antenna plate 102*e* defines a larger surface area than a surface area defined by the antenna plate 102*d* of the gesture sensor assembly 100*d* of FIGS. 8-11. Additionally, the cover 202*e* may define the secondary receiving slot 224 operative to receive the portion of the length of the PCB 114*d* that extends beyond the second end 203*e* of the sensor housing 202*e* when the cover 202*e* fastens to the sensor housing 200*e*.

As the cover 202*e* of the gesture sensor assembly 200*e* is supported by the reflector 108*d*, the antenna plate 102*e* retained by the cover 202*e* is positioned closer to the reflector 108*d* than the antenna plate 102*d* retained by the cover 202*d* of the gesture sensor assembly 200*d* of FIGS. 8-11. For example, the antenna plate 102*e* retained by the cover 202*e* may be substantially flush with the exterior surface 188 of the reflector 108*d* when the cover 202*e* fastens to the reflector 108*d*, thereby eliminating or drastically reducing the distance between the antenna plate 102*e* and the exterior surface 188 of the reflector 108*d*. Accordingly, the fastening of the cover 202*e* to the reflector 108*d* arranges the antenna plate 102*e* with a position/orientation relative to the exterior surface 188 of the reflector 108*d* that increases the sensitivity of the sensing electrical field when the antenna plate 102*e* is energized.

Referring to FIG. 13, a front view of the gesture sensor assembly 100*e* is provided and shows a front face of the cover 202*e* defining an antenna slot 222*e* operative to receive and support the antenna plate 102*d*. In some examples, the antenna plate 102*e* is substantially flush with the front face of the cover 202*e* when received by the antenna slot 222*e*. As the antenna plate 102*e* may define a larger surface area than the antenna plate 102*d* of the gesture sensor assembly 100*d* of FIGS. 8-11, a separation distance Ds between an outer circumference of the cover 202*e* and the antenna plate 102*e* is drastically reduced to increase sensitivity of the sensing electrical field. In doing so, the reflector 108*d* may readily electrically couple to the sensing electrical field when the antenna plate 102*e* is energized to increase the sensitive area thereof. In some examples, the sensing electrical field activates the entire surface of the reflector 108*d* to permit the whole reflector 108*d* to cooperate with the antenna plate 102*e* to detect a gesture executed at or near the exterior surface 188 of the reflector 108*d*.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A light assembly comprising:
   a fixture housing;
   a gesture sensor assembly including a gesture sensor operable to provide a sensing electrical field sensitive to gestures executed a predetermined distance from the gesture sensor;
   a light source supported by the fixture housing; and
   a reflector supported by the fixture housing and supporting a portion of the gesture sensor assembly, the reflector operable to (i) control direction of light emitted from the light source and (ii) expand the sensing electric field provided by the gesture sensor;
   wherein the gesture sensor is located within the reflector and directly abuts an interior wall of the reflector.

2. The light assembly of claim 1, wherein the gesture sensor assembly comprises:
   a printed circuit board;
   the gesture sensor comprising an antenna plate supported by the printed circuit board; and
   a controller supported by the printed circuit board and operable to control the antenna plate from a de-energized state to an energized state to provide the sensing electrical field.

3. The light assembly of claim 2, wherein the printed circuit board is supported by the reflector and the antenna plate is integrally formed with the printed circuit board.

4. The light assembly of claim 2, wherein the gesture sensor assembly further comprises:
   a sensor housing configured to receive the printed circuit board, wherein the antenna plate includes a first end supported by the printed circuit board and a second end extending away from the sensor housing; and
   an antenna wire operatively coupled to the printed circuit board and the antenna plate, the antenna wire operable to receive an electrical signal from the controller to control the antenna plate from the de-energized state to the energized state.

5. The light assembly of claim 4, wherein the sensor housing is supported by the fixture housing.

6. The light assembly of claim 4, wherein the sensor housing is supported by the reflector.

7. The light assembly of claim 1, wherein the gesture sensor assembly comprises:
   a carrier supported by the fixture housing;
   the gesture sensor comprising one or more antenna plates supported by the carrier; and
   a controller supported by the carrier and operably connected to the antenna plates, the controller operable to control the antenna plates from a de-energized state to an energized state to provide the sensing electrical field.

8. The light assembly of claim 7, wherein the carrier defines an aperture configured to receive a light source socket supported by the reflector.

9. The light assembly of claim 1, wherein the gesture sensor assembly comprises:

a sensor housing defining a longitudinal axis between a first end and a second end, the sensor housing defining a receiving slot that extends between the first end of the sensor housing and the second end of the sensor housing;

a printed circuit board received within the receiving slot of the sensor housing and defining a length that extends in a first direction substantially parallel to the longitudinal axis of the sensor housing;

the gesture sensor comprising an antenna plate disposed proximate to the second end of the sensor housing and defining a length that extends in a second direction substantially perpendicular to the longitudinal axis of the sensor housing; and a controller supported by the printed circuit board and operatively connected to the antenna plate, the controller operable to control the antenna plate from a de-energized state to an energized state to provide the sensing electrical field.

10. The light assembly of claim 9, wherein the second end of the sensor housing is supported by the reflector and the first end of the sensor housing extends away from the reflector and through an aperture formed through the fixture housing.

11. The light assembly of claim 9, further comprising a gesture socket supported by the fixture housing and operable to support the sensor housing, wherein the first end of the sensor housing is received by the gesture socket and the second end of the sensor housing extends through an aperture formed through the reflector.

12. The light assembly of claim 9, wherein the reflector is electrically coupled to the sensing electrical field and operable to control the sensing electrical field based on a distance between the reflector and the antenna plate.

13. The light assembly of claim 1, further comprising a controller operatively connected to the gesture sensor and the light source, the controller operative to control the light source from an OFF state to an ON state when the gesture sensor detects a gesture within the predetermined distance.

14. A taillight assembly comprising:
   at least one light source;
   a reflector operable to control direction of light from the light source;
   a gesture sensor including a portion supported by the reflector, the gesture sensor operable to provide a sensing electrical field configured to detect gestures executed a predetermined distance from the gesture sensor; and
   a controller operably connected to the gesture sensor, the controller operable to control the gesture sensor from a de-energized state to an energized state to provide the sensing electrical field;
   wherein the reflector is configured to expand the sensing electrical field provided by the gesture sensor;
   wherein the gesture sensor is located within the reflector and directly abuts an interior wall of the reflector.

15. The taillight assembly of claim 14, wherein the gesture sensor comprises at least one antenna plate supported by the reflector.

16. The taillight assembly of claim 14, further comprising:
   a sensor housing configured to support the controller and the gesture sensor, the sensor housing defining a longitudinal axis that extends between a first end and a second end;
   wherein the gesture sensor comprises an antenna plate disposed at the second end of the sensor housing and defining a length that extends in a direction substantially perpendicular to the longitudinal axis.

17. The taillight assembly of claim 16, wherein the second end of the sensor housing is supported by the reflector and the first end of the sensor housing extends through an aperture formed through a fixture housing that supports the reflector and the light source.

18. The taillight assembly of claim 16, further comprising:
   a fixture housing configured to support the reflector and the light source; and
   a gesture socket supported by the fixture housing, the gesture socket operative to support the sensor housing;
   wherein the first end of the sensor housing is received by the gesture socket and the second end of the sensor housing extends through an aperture formed through the reflector.

19. The taillight assembly of claim 16, wherein the reflector controls the sensing electrical field based on a distance between the reflector and the antenna plate.

* * * * *